(12) United States Patent
Chen et al.

(10) Patent No.: US 12,156,176 B2
(45) Date of Patent: Nov. 26, 2024

(54) PARTIAL SENSING ENHANCEMENT FOR SIDELINK RESOURCE ALLOCATION

(71) Applicant: MediaTek Singapore Pte. Ltd., Singapore (SG)

(72) Inventors: Tao Chen, Beijing (CN); Ming-Yuan Cheng, Hsinchu (TW); Ahmet Umut Ugurlu, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 569 days.

(21) Appl. No.: 17/396,592

(22) Filed: Aug. 6, 2021

(65) Prior Publication Data

US 2022/0046596 A1  Feb. 10, 2022

(30) Foreign Application Priority Data

Aug. 5, 2021  (CN) .......................... 202110895534.5

(51) Int. Cl.
*H04W 72/02* (2009.01)
*H04W 4/40* (2018.01)
*H04W 24/08* (2009.01)
*H04W 72/0446* (2023.01)

(52) U.S. Cl.
CPC ............. *H04W 72/02* (2013.01); *H04W 4/40* (2018.02); *H04W 24/08* (2013.01); *H04W 72/0446* (2013.01)

(58) Field of Classification Search
CPC ....... H04W 4/40; H04W 24/08; H04W 72/02; H04W 72/0446
See application file for complete search history.

(56) References Cited

U.S. PATENT DOCUMENTS

| | | | |
|---|---|---|---|
| 2019/0075548 A1 | 3/2019 | Lee et al. | |
| 2019/0141555 A1 | 5/2019 | Tooher et al. | |
| 2019/0394786 A1 | 12/2019 | Parron et al. | |
| 2020/0029245 A1 | 1/2020 | Khoryaev et al. | |
| 2020/0107297 A1* | 4/2020 | Wang | H04W 72/0446 |

(Continued)

FOREIGN PATENT DOCUMENTS

| | | |
|---|---|---|
| CN | 104902455 A | 9/2015 |
| CN | 108432214 A | 8/2018 |

(Continued)

OTHER PUBLICATIONS

Taiwan Intellectual Property Office, Office Action in Taiwan Patent Application No. 110129239, Mar. 6, 2023.

(Continued)

*Primary Examiner* — Brian P Cox
(74) *Attorney, Agent, or Firm* — Andy M. Han; Han IP PLLC

(57) ABSTRACT

Various examples and schemes pertaining to partial sensing enhancement for sidelink (SL) resource allocation in New Radio (NR) vehicle-to-everything (V2X) communications are described. A user equipment (UE) performs one-shot sensing and periodic sensing prior to a transmission. The UE selects a resource based on results of the one-shot sensing and the period sensing. Then, the UE performs the transmission using the selected resource in a SL communication in a V2X network.

20 Claims, 5 Drawing Sheets

(56) References Cited

U.S. PATENT DOCUMENTS

2023/0141380 A1* 5/2023 Yu .......................... H04W 72/40
370/329

FOREIGN PATENT DOCUMENTS

| | | |
|---|---|---|
| CN | 111246426 A | 6/2020 |
| WO | WO 2018027528 A1 | 2/2018 |

OTHER PUBLICATIONS

Taiwan Intellectual Property Office, Office Action for Taiwan Patent Application No. 110129239, Feb. 23, 2022.
China National Intellectual Property Administration, First Office Action in China Patent Application No. 202110895534.5, Apr. 29, 2023.

* cited by examiner

PARTIAL SENSING ENHANCEMENT FOR SIDELINK RESOURCE ALLOCATION

CROSS REFERENCE TO RELATED PATENT APPLICATION(S)

The present disclosure claims the priority benefit of China Patent Application No. CN 202110895534.5, filed 5 Aug. 2021, which is part of a Chinese national stage application of PCT Application No. PCT/CN2020/107818, filed 7 Aug. 2020. Contents of aforementioned applications are herein incorporate by reference in their entirety.

TECHNICAL FIELD

The present disclosure is generally related to wireless communications and, more particularly, to partial sensing enhancement for sidelink (SL) resource allocation.

BACKGROUND

Unless otherwise indicated herein, approaches described in this section are not prior art to the claims listed below and are not admitted as prior art by inclusion in this section.
Under the $3^{rd}$ Generation Partnership Project (3GPP) specifications for $5^{th}$ Generation (5G) New Radio (NR), vehicle-to-everything (V2X) SL communications can be supported by unicast, groupcast and broadcast communications. However, there remain certain issues that need to be addressed with respect to power saving by partial sensing for resource allocation for SL communications. Therefore, there is a need for a solution of partial sensing enhancement for SL resource allocation.

SUMMARY

The following summary is illustrative only and is not intended to be limiting in any way. That is, the following summary is provided to introduce concepts, highlights, benefits and advantages of the novel and non-obvious techniques described herein. Selected implementations are further described below in the detailed description. Thus, the following summary is not intended to identify essential features of the claimed subject matter, nor is it intended for use in determining the scope of the claimed subject matter.
One objective of the present disclosure is to propose various schemes, concepts, designs, methods, systems and apparatuses pertaining to partial sensing enhancement for SL resource allocation. It is believed that various schemes proposed herein may provide partial sensing enhancement for SL resource allocation to address certain issues in 5G NR V2X communications.
In one aspect, a method may involve performing one-shot sensing and periodic sensing prior to a transmission. The method may also involve selecting a resource based on results of the one-shot sensing and the period sensing. The method may further involve performing the transmission using the selected resource in a SL communication in a V2X network.
In another aspect, a method may involve determining whether each of one or more candidate resources is subject to interference caused by periodic and aperiodic transmissions from one or more other UEs in a V2X network. The method may also involve selecting a resource from the one or more candidate resources based on a result of the determining. The method may further involve performing a SL communication using the selected resource.

In yet another aspect, an apparatus may include a transceiver and a processor coupled to the transceiver. The transceiver may be configured to communicate wirelessly in a SL communication in a V2X network. The processor may be configured to perform operations including: (a) performing, via the transceiver, one-shot sensing and periodic sensing prior to a transmission; (b) selecting a resource based on results of the one-shot sensing and the period sensing; and (c) performing, via the transceiver, the transmission using the selected resource.

It is noteworthy that, although description provided herein may be in the context of certain radio access technologies, networks and network topologies such as 5G/NR V2X, the proposed concepts, schemes and any variation(s)/derivative(s) thereof may be implemented in, for and by other types of radio access technologies, networks and network topologies such as, for example and without limitation, Long-Term Evolution (LTE), LTE-Advanced, LTE-Advanced Pro, Wireless Fidelity (Wi-Fi) and any future-developed networks and technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Figure 1:
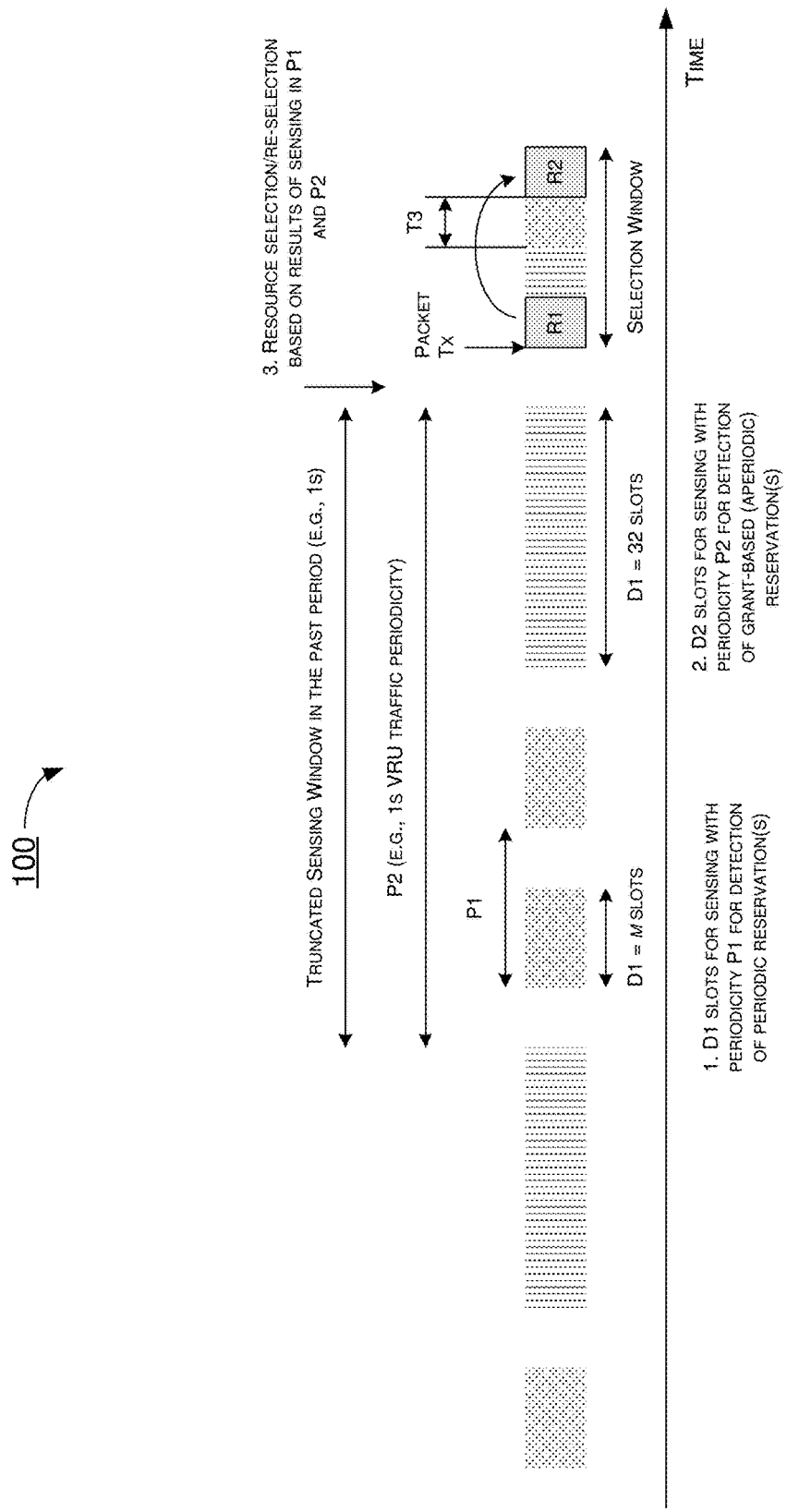
FIG. 1 is a diagram of an example scenario under a proposed scheme in accordance with the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to partial sensing enhancement for SL resource allocation in NR V2X communications. According to the present disclosure, a number of possible solutions or schemes may be implemented separately or jointly. That is, although these possible solutions/schemes may be described below separately, two or more of these possible solutions/schemes may be implemented in one combination or another.

Under a proposed scheme in accordance with the present disclosure regarding SL resource allocation, a user equipment (UE) may perform partial sensing for resource allocation and transmission while saving or otherwise conserving its power. Under the proposed scheme, to maintain performance in sensing while saving power, the UE may perform aperiodic one-shot sensing (herein interchangeably referred to as "contiguous sensing" and "contiguous partial sensing") and periodic sensing to detect any resource reservation by other UE(s) from both a periodic transmission and an aperiodic transmission, so as to avoid the UE reserving resource(s) already reserved by any other UE.

That is, with partial sensing, once the UE identifies one or more candidate resources for use to receive packet(s) within a selection window relative to (e.g., after) a packet arrival time, given the periodic nature of partial sensing, for each candidate resource the UE may backtrack to detect the respective periodic sensing and aperiodic sensing to determine whether or not the candidate resource has already been reserved by any other UE. Subsequently, based on a result of the detection, the UE may select and reserve one or more resources that has/have not be periodically reserved by another UE for use to receive or transmit packet(s). Under the proposed scheme, other than periodic sensing, the UE may additionally perform contiguous sensing in that, after the packet arrival time is known, the UE may backtrack based on the packet arrival time to perform the contiguous sensing. The duration of contiguous sensing may be longer than that of periodic sensing to detect any aperiodic traffic/activities/reservations that fall outside windows of periodic sensing so as to avoid reserving resource(s) that may likely suffer interference by both periodic traffic and aperiodic traffic from other UE(s).

To detect the periodic transmission, a periodic sensing pattern defined by the periodicity, sensing duration and/or a time offset may be used. To detect the aperiodic transmission, aperiodic (or contiguous) sensing may be applied. Such contiguous sensing may occur before resource selection or re-selection (hereinafter denoted as "(re-)selection") of one or more resources among a plurality of candidate resources with a duration of N slots. Considering that sidelink control information (SCI) may at most indicate the reserved resource at 32 slots away from a current time, N may be set to be 31 or 32 so that aperiodic resource reservation may be sensed in the past 31 or 32 slots.

Under the proposed scheme, contiguous sensing may be performed periodically in case that there is a periodic data transmission with contiguous sensing before each transmission for resource (re-)selection. In such cases, the sensing may be considered as dual-period sensing for such periodic data transmission. Moreover, the contiguous sensing may be applied before the transmission or (re-)selection of any reserved or (re-)selected resources. Additionally, a resource (re-)selection window may include an overlapping duration between the periodic sensing pattern and a time duration in which the contiguous sensing is performed to avoid the impact or interference from any periodic and/or aperiodic transmissions by other UE(s). Such partial sensing may be especially beneficial for vulnerable users (VRU) to conserve power.

FIG. 1 illustrates an example scenario 100 of a procedure for a UE to perform partial sensing for resource allocation under a proposed scheme in accordance with the present disclosure. In scenario 100, assuming the UE has a periodic traffic for transmission every 1 second (s), the UE may perform periodic sensing every P1 slots or milliseconds (ms) with a duration D1 of m slots or ms (e.g., 10 slots or ms) for detection of periodic reservation(s) by other UE(s) so that any other periodic transmission with a periodicity which is a multiple of P1 may be detected. The P1/D1 pattern may be used for sensing of periodic reservation by other UEs. P1 may be derived from reservation periodicities (pre-)configured per resource pool. The time offset of P1/D1 pattern may be derived from a known packet arrival time or a resource (re-)selection time at the receiving UE. In case that the earliest available time for potential transmission or the time for packet arrival or the time for resource (re-)selection is at time R1, then it may be considered as the starting time of the D1. Accordingly, the P1/D1 pattern may be determined. Advantageously, the partial sensing results may be timely used for resource (re-)selection without any latency impact on packet transmission. For example, locations of D1 may be {t, t+m} with periodicity P1, with t being the packet arrival time or resource (re-)selection time. Additionally, some processing time or minimum time offset (MinT) may be added so that locations of D1 may be {t+MinT, t+MinT+m} with periodicity P1.

As shown in FIG. 1, UE may perform another sensing (or contiguous sensing) every P2 slots/ms with a duration D2 of m slots or ms (e.g., 31 slots or ms) for detection of grant-based (aperiodic) reservation(s) by other UE(s). For instance, P2 may be set as 1 second, e.g., to be the same as the periodicity of the periodic transmission. Such sensing may take place before the (re-)selection time determined by the UE based on the packet arrival time and processing time. Accordingly, any other aperiodic transmission falling within the selection window may be detected. The P2/D2 pattern may be used for sensing of aperiodic reservation or multiple resource reservation with up to 32 slots as indicated in SCI. In other words, D2 may be (pre-)configured or specified up to 32 slots. The ending time of sensing may be before or at the (re-)selection of the resources. For example, the ending time of sensing may be the time for resource (re-)selection (or the time for packet arrival) minus the processing time (T_proc), e.g., t−T_proc. Accordingly, the starting time for D2 sensing may be derived from the ending time and a value of D2, e.g., t−T_proc−32 with D2=32 slots.

Under the proposed scheme, a UE (or VRU) may select resources for transport block (TB) (re-)transmissions during a selection window which at least includes: the P1/D1 pattern, a duration with potential aperiodic transmission by sensing in D2, and/or a packet delay budget (PDB). The duration with potential aperiodic transmission by sensing in D2 may be {t, t+m} in case that D2 sensing occurs at {t−m, t}. Considering some processing time before and/or after t, the duration may be {t+MinT, t+m−MinT} or {t+MinT, t+m−2*MinT} or {t+MinT, t+m−MinT−T_proc} in case that D2 sensing occurs at {t−D2−T_proc, t−T_proc} or {t−D2−MinT, t−MinT}. Ideally, an overlapping duration between P1/D1 pattern and the duration with potential aperiodic transmission by sensing in D2 may be prioritized for resource (re-)selection due to sufficient sensing information. Besides, the packet delay budget may be considered for resource (re-)selection so that the latency requirement for the packet may be satisfied.

Under the proposed scheme, for re-selection of resource(s) due to re-evaluation or preemption, one-short sensing may be still applied with a D2 location derived from a re-selection time or a time for the reserved resource(s). For example, as shown in FIG. 1, in case of preemption at time R2 on resource(s) reserved at time R1, the UE may perform D2 sensing with an ending time before or at the time instant with time R2 minus T3. Here, T3 may be the processing time T_proc. Meanwhile, P1/D1 sensing may be performed anyway. Accordingly, the re-selection of the resource(s) may be based on P1/D1 sensing, the updated D2 sensing, and the packet delay budget.

Under another proposed scheme, an indicator may be carried in SCI transmitted by one UE to indicate to other UE(s) that the UE transmitting the SCI is a partial-sensing UE with the need of power saving, so that the other UE(s) may transmit data to the partial-sensing UE during a sensing duration (e.g., during a periodic sensing duration and/or a contiguous sensing duration). Moreover, under the proposed scheme, a common SL discontinuous reception (DRX) pattern may be configured for such partial-sensing UE. According, when any other UE transmits data to the partial-sensing UE, the transmitting UE may select the resources during a SL DRX_On duration (during which the UE is active and not in sleep mode) for transmission. Moreover, in case that SL unicast is established, the transmitting UE may further follow the sensing pattern of the partial-sensing UE for data reception based on signaling exchange (e.g., PC5 interface-radio resource control (PC5-RRC) signaling exchange) between the transmitting UE and the partial-sensing UE. Accordingly. the partial-sensing UE may be active (e.g. not in a sleep or low-power mode) during the (common) SL DRX_On duration for broadcast/unicast reception (and sensing), for its own partial sensing duration (e.g., during periodic and one-shot sensing windows) for unicast reception and sensing, and/or for its own transmission time. For other durations of time, the partial-sensing UE may be enter a sleep mode for saving power, except for any SL synchronization time when necessary. For instance, the partial-sensing UE may perform sensing only on a physical sidelink control channel-demodulation reference signal (PSCCH-DMRS) so that, due to the PSCCH being front loaded in a slot, the partial-sensing UE may enter a micro sleep mode for the remainder of time in the slot.

Figure 2:
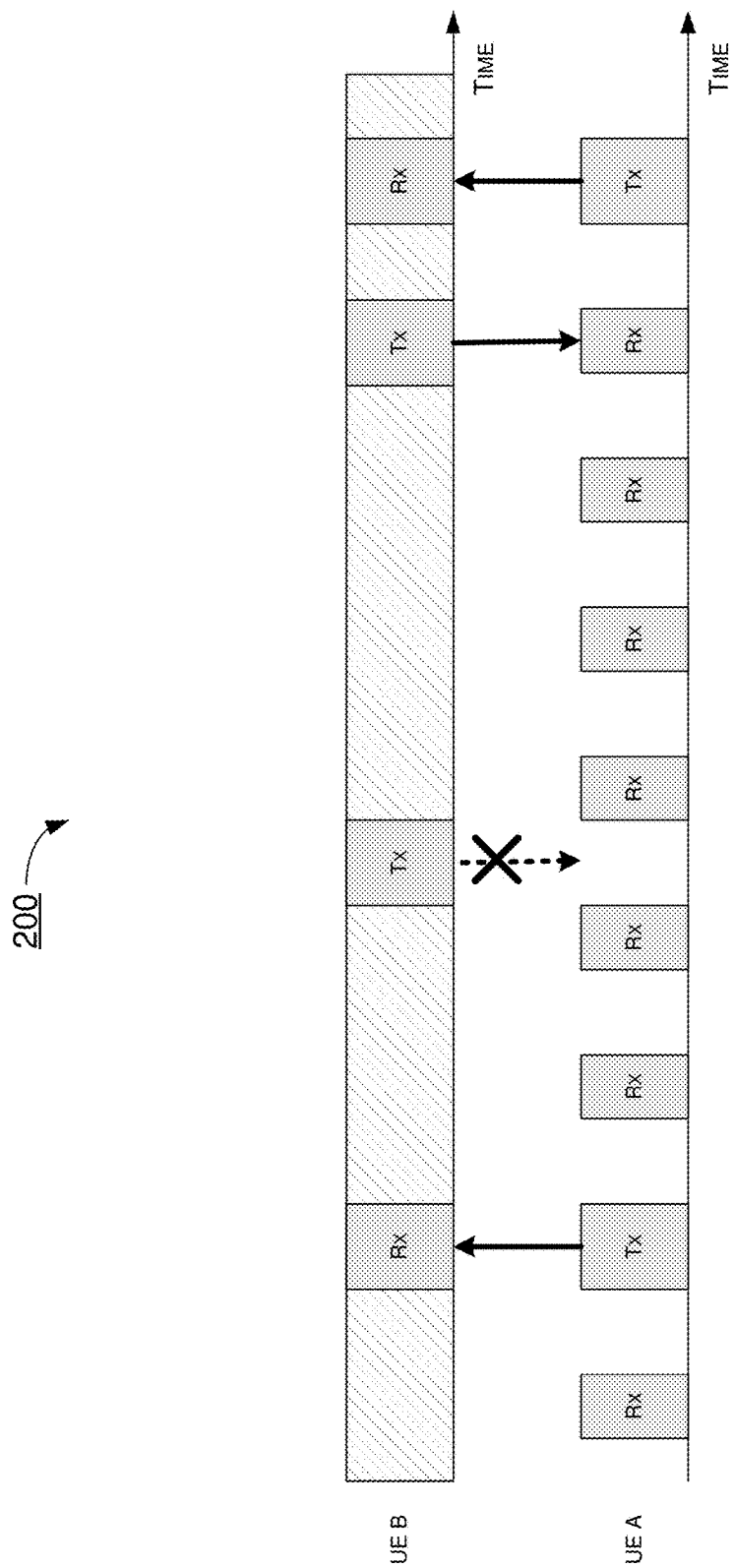
FIG. 2 is a diagram of an example scenario under a proposed scheme in accordance with the present disclosure.

FIG. 2 illustrates an example scenario 200 under a proposed scheme in accordance with the present disclosure. Scenario 200 may involve two UEs, denoted as UE A and UE B in FIG. 2. Referring to FIG. 2, UE A may perform sensing and data reception during a reception (Rx) duration when its SL DRX patterns may be aligned or overlapped (fully or partially) with a partial sensing pattern. Moreover, UE B may transmit data in the Rx duration of UE A. UE B may be informed of such a Rx pattern of UE A based on (pre-)configuration per resource pool or PC5-RRC signaling or broadcast information. An indicator for partial sensing or VRU-type UE in SCI of UE A may assist UE B to derive or otherwise determine the Rx pattern of UE A associated with some (pre-)configuration. Additionally, UE B may follow a transmission (Tx) pattern to receive transmissions from UE A, thereby reducing the complexity and power consumption for UE B by avoidance of a full-time detection of transmission(s) from UE A.

Illustrative Implementations

Figure 3:
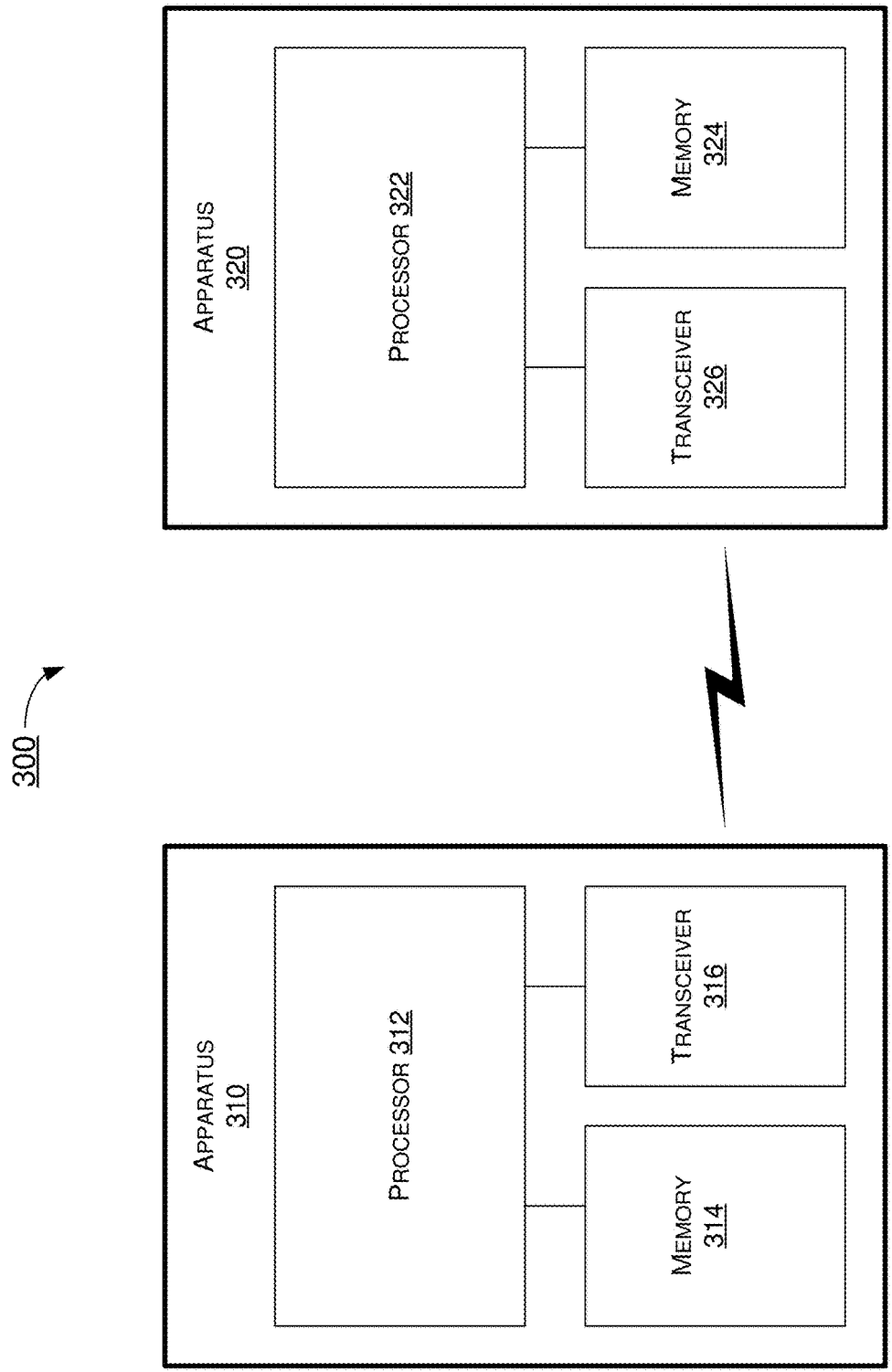
FIG. 3 is a block diagram of an example communication environment in which various proposed schemes in accordance with the present disclosure may be implemented.

FIG. 3 illustrates an example communication environment 300 having an example apparatus 310 and an example apparatus 320 in accordance with an implementation of the present disclosure. Each of apparatus 310 and apparatus 320 may perform various functions to implement schemes, techniques, processes and methods described herein pertaining to partial sensing enhancement for SL resource allocation in NR V2X communications, including various schemes described herein.

Each of apparatus 310 and apparatus 320 may be a part of an electronic apparatus, which may be a UE such as a vehicle, a portable or mobile apparatus, a wearable apparatus, a wireless communication apparatus or a computing apparatus. For instance, each of apparatus 310 and apparatus 320 may be implemented in an electronic control unit (ECU) of a vehicle, a smartphone, a smartwatch, a personal digital assistant, a digital camera, or a computing equipment such as a tablet computer, a laptop computer or a notebook computer. Each of apparatus 310 and apparatus 320 may also be a part of a machine type apparatus, which may be an IoT or NB-IoT apparatus such as an immobile or a stationary apparatus, a home apparatus, a wire communication apparatus or a computing apparatus. For instance, each of apparatus 310 and apparatus 320 may be implemented in a smart thermostat, a smart fridge, a smart door lock, a wireless speaker or a home control center. Alternatively, each of apparatus 310 and apparatus 320 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Each of apparatus 310 and apparatus 320 may include at least some of those components shown in FIG. 3 such as a processor 312 and a processor 322, respectively. Each of apparatus 310 and apparatus 320 may further include one or more other components not pertinent to the proposed scheme of the present disclosure (e.g., internal power supply, display device and/or user interface device), and, thus, such component(s) of each of apparatus 310 and apparatus 320 are neither shown in FIG. 3 nor described below in the interest of simplicity and brevity.

In some implementations, at least one of apparatus 310 and apparatus 320 may be a part of an electronic apparatus, which may be a vehicle, a roadside unit (RSU), network node or base station (e.g., eNB, gNB or TRP), a small cell, a router or a gateway. For instance, at least one of apparatus 310 and apparatus 320 may be implemented in a vehicle in a V2V or V2X network, an eNodeB in an LTE, LTE-Advanced or LTE-Advanced Pro network or in a gNB in a 5G, NR, IoT or NB-IoT network. Alternatively, at least one of apparatus 310 and apparatus 320 may be implemented in the form of one or more IC chips such as, for example and without limitation, one or more single-core processors, one or more multi-core processors, one or more RISC processors, or one or more CISC processors.

In one aspect, each of processor 312 and processor 322 may be implemented in the form of one or more single-core processors, one or more multi-core processors, one or more RISC processors, or one or more CISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including partial sensing enhancement for SL resource allocation in NR V2X communications in accordance with various implementations of the present disclosure.

In some implementations, apparatus 310 may also include a transceiver 316, as a communication device, coupled to processor 312 and capable of wirelessly transmitting and receiving data. In some implementations, apparatus 310 may further include a memory 314 coupled to processor 312 and capable of being accessed by processor 312 and storing data therein. In some implementations, apparatus 320 may also include a transceiver 326, as a communication device, coupled to processor 322 and capable of wirelessly transmitting and receiving data. In some implementations, apparatus 320 may further include a memory 324 coupled to processor 322 and capable of being accessed by processor 322 and storing data therein. Accordingly, apparatus 310 and apparatus 320 may wirelessly communicate with each other via transceiver 316 and transceiver 326, respectively.

To aid better understanding, the following description of the operations, functionalities and capabilities of each of apparatus 310 and apparatus 320 is provided in the context of a NR V2X communication environment in which apparatus 310 is implemented in or as a wireless communication device, a communication apparatus or a first UE and apparatus 320 is implemented in or as wireless communication device, a communication apparatus or a second UE.

Under various proposed schemes pertaining to partial sensing enhancement for SL resource allocation in NR V2X communications in accordance with the present disclosure, processor 312 of apparatus 310 may perform, via transceiver 316, one-shot sensing and periodic sensing prior to a transmission. Additionally, processor 312 may select a resource based on results of the one-shot sensing and the period sensing. Moreover, processor 312 may perform, via transceiver 316, the transmission (e.g., to apparatus 320) using the selected resource in a SL communication in a V2X network.

In some implementations, in performing the one-shot sensing, processor 312 may perform contiguous partial sensing to monitor a plurality of slots in a duration before transmitting on a reserved resource, a re-selected resource or the selected resource.

In some implementations, in performing the one-shot sensing and the periodic sensing, processor 312 may perform certain operations. For instance, processor 312 may identify one or more candidate resources within a selection window after a point in time. Moreover, processor 312 may perform the one-shot sensing and the periodic sensing prior to the point in time based on a location in time of each of the one or more candidate resources.

In some implementations, in performing the one-shot sensing, processor 312 may perform contiguous partial sensing to monitor a plurality of slots in a duration before the point in time.

In some implementations, in selecting the resource, processor 312 may select the resource based on results of the aperiodic sensing and the periodic sensing.

In some implementations, the point in time may be a packet arrival time.

In some implementations, the selection window may include an overlapping duration between a periodic sensing pattern associated with the periodic sensing and a contiguous duration in which the one-shot sensing is performed.

Under various proposed schemes pertaining to partial sensing enhancement for SL resource allocation in NR V2X communications in accordance with the present disclosure, processor 322 of apparatus 320 may determine whether each of one or more candidate resources is subject to interference caused by periodic and aperiodic transmissions from one or more other UEs in a V2X network. Moreover, processor 322 may select a resource from the one or more candidate resources based on a result of the determining. Furthermore, processor 322 may perform, via transceiver 326, a sidelink (SL) communication using the selected resource.

In some implementations, in determining whether each of the one or more candidate resources is subject to interference, processor 322 may perform certain operations. For instance processor 322 may identify the one or more candidate resources within a selection window after a point in time. Moreover, processor 322 may perform, via transceiver 326, aperiodic sensing and periodic sensing prior to the point in time based on a location in time of each of the one or more candidate resources.

In some implementations, in performing the aperiodic sensing, processor 322 may perform contiguous partial sensing to monitor a plurality of slots in a duration before the point in time.

In some implementations, in selecting the resource, processor 322 may select the resource based on results of the aperiodic sensing and the periodic sensing.

In some implementations, the point in time may be a packet arrival time.

In some implementations, the selection window may include an overlapping duration between a periodic sensing pattern associated with the periodic sensing and a contiguous duration in which the aperiodic sensing is performed.

Illustrative Processes

Figure 4:
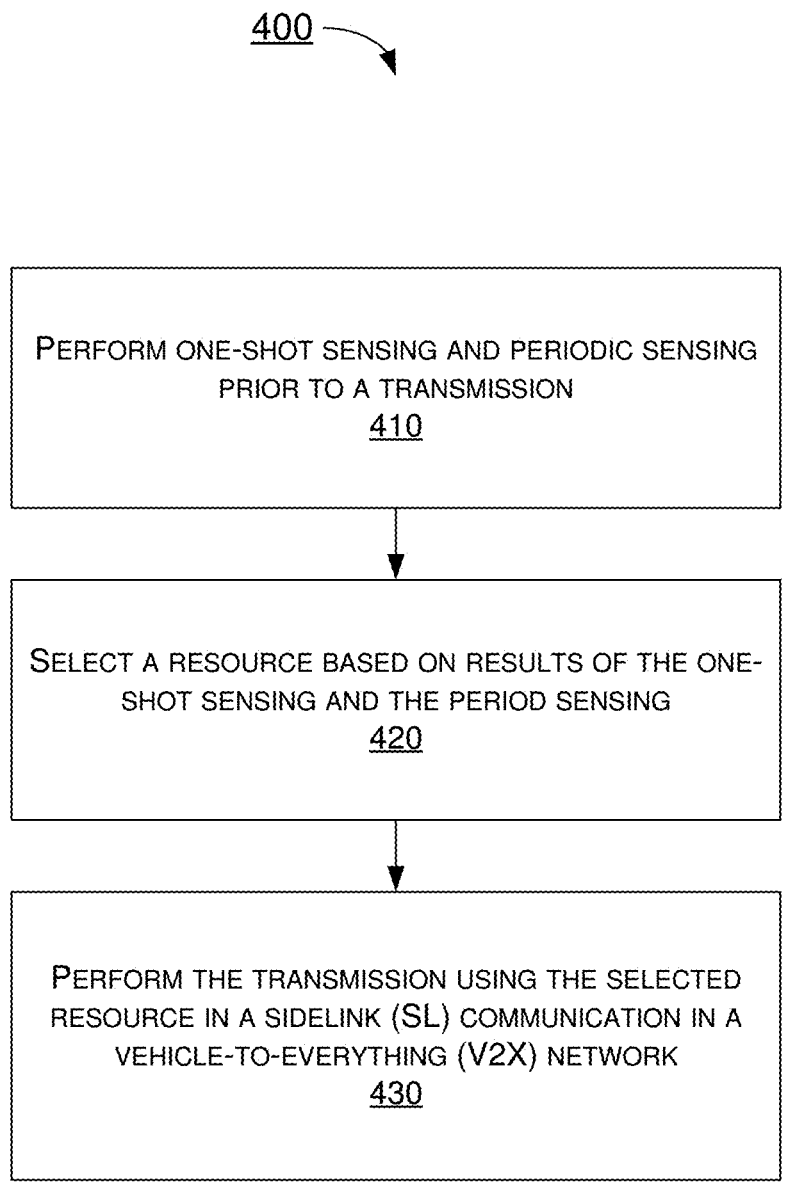
FIG. 4 is a flowchart of an example process under a proposed scheme in accordance with an implementation of the present disclosure.

FIG. 4 illustrates an example process 400 in accordance with an implementation of the present disclosure. Process 400 may be an example implementation of the proposed schemes described above with respect to partial sensing enhancement for SL resource allocation in NR V2X communications in accordance with the present disclosure. Process 400 may represent an aspect of implementation of features of apparatus 310 and apparatus 320. Process 400 may include one or more operations, actions, or functions as illustrated by one or more of blocks 410, 420 and 430. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may also be repeated partially or entirely. Process 400 may be implemented by apparatus 310, apparatus 320 and/or any suitable wireless communication device, UE, roadside unit (RUS), base station or machine type devices. Solely for illustrative purposes and without limitation, process 400 is described below in the context of apparatus 310 as a first UE and apparatus 320 as a second UE. Process 400 may begin at block 410.

At block 410, process 400 may involve processor 312 of apparatus 310 performing, via transceiver 316, one-shot sensing and periodic sensing prior to a transmission. Process 400 may proceed from block 410 to block 420.

At block 420, process 400 may involve processor 312 selecting a resource based on results of the one-shot sensing and the period sensing. Process 400 may proceed from block 420 to block 430.

At block 430, process 400 may involve processor 312 performing, via transceiver 316, the transmission using the selected resource in a SL communication in a V2X network.

In some implementations, in performing the one-shot sensing, process 400 may involve processor 312 performing contiguous partial sensing to monitor a plurality of slots in a duration before transmitting on a reserved resource, a re-selected resource or the selected resource.

In some implementations, in performing the one-shot sensing and the periodic sensing, process 400 may involve processor 312 performing certain operations. For instance, process 400 may involve processor 312 identifying one or more candidate resources within a selection window after a point in time. Moreover, process 400 may involve processor 312 performing the one-shot sensing and the periodic sensing prior to the point in time based on a location in time of each of the one or more candidate resources.

In some implementations, in performing the one-shot sensing, process 400 may involve processor 312 performing contiguous partial sensing to monitor a plurality of slots in a duration before the point in time.

In some implementations, in selecting the resource, process 400 may involve processor 312 selecting the resource based on results of the aperiodic sensing and the periodic sensing.

In some implementations, the point in time may be a packet arrival time.

In some implementations, the selection window may include an overlapping duration between a periodic sensing pattern associated with the periodic sensing and a contiguous duration in which the one-shot sensing is performed.

Figure 5:
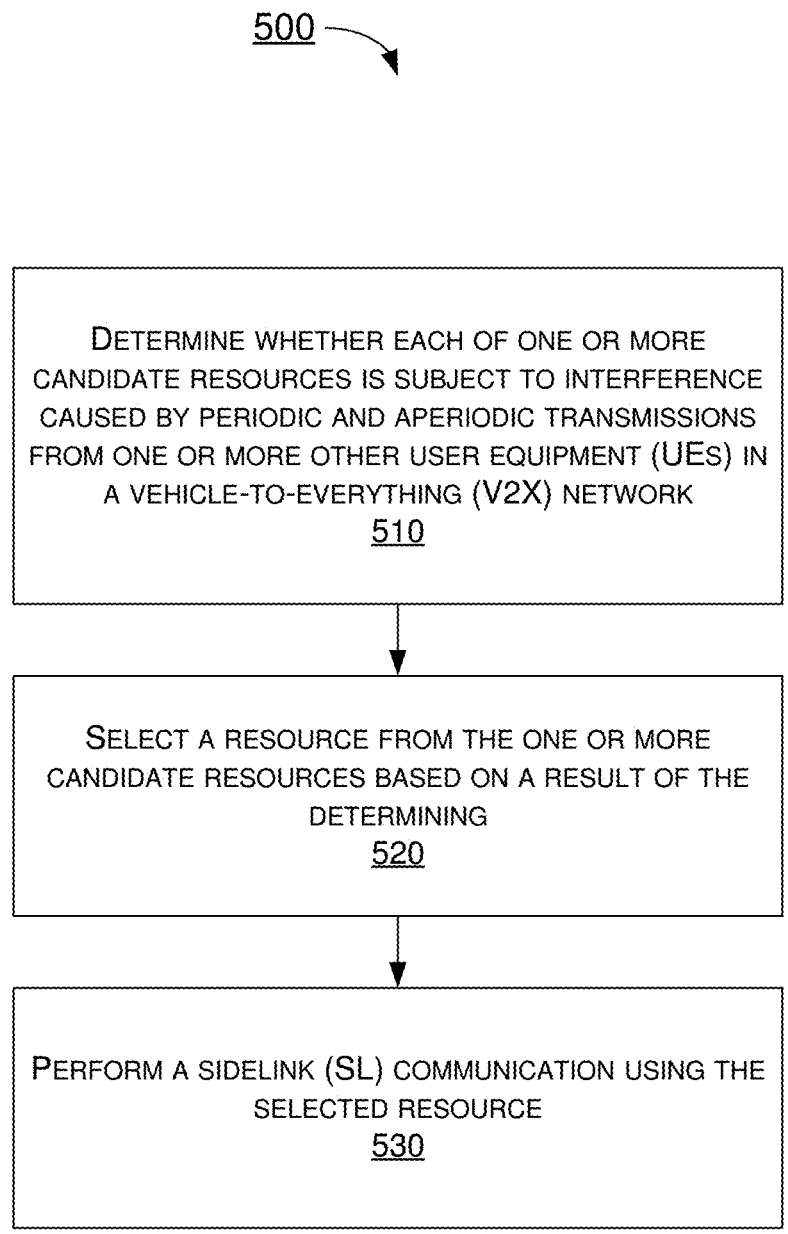
FIG. 5 is a flowchart of an example process under a proposed scheme in accordance with an implementation of the present disclosure.

FIG. 5 illustrates an example process 500 in accordance with an implementation of the present disclosure. Process 500 may be an example implementation of the proposed schemes described above with respect to partial sensing enhancement for SL resource allocation in NR V2X communications in accordance with the present disclosure. Process 500 may represent an aspect of implementation of features of apparatus 310 and apparatus 320. Process 500 may include one or more operations, actions, or functions as illustrated by one or more of blocks 510, 520 and 520. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may also be repeated partially or entirely. Process 500 may be implemented by apparatus 310, apparatus 320 and/or any suitable wireless communication device, UE, roadside unit (RUS), base station or machine type devices. Solely for illustrative purposes and without limitation, process 500 is described below in the context of apparatus 310 as a first UE and apparatus 320 as a second UE. Process 500 may begin at block 510.

At block 510, process 500 may involve processor 322 of apparatus 320 determining whether each of one or more candidate resources is subject to interference caused by periodic and aperiodic transmissions from one or more other UEs in a V2X network. Process 500 may proceed from block 510 to block 520.

At block 520, process 500 may involve processor 322 selecting a resource from the one or more candidate resources based on a result of the determining. Process 500 may proceed from block 520 to block 530.

At block 530, process 500 may involve processor 322 performing, via transceiver 326, a sidelink (SL) communication using the selected resource.

In some implementations, in determining whether each of the one or more candidate resources is subject to interference, process 500 may involve processor 322 performing certain operations. For instance, process 500 may involve processor 322 identifying the one or more candidate resources within a selection window after a point in time. Moreover, process 500 may involve processor 322 performing, via transceiver 326, aperiodic sensing and periodic sensing prior to the point in time based on a location in time of each of the one or more candidate resources.

In some implementations, in performing the aperiodic sensing, process 500 may involve processor 322 performing contiguous partial sensing to monitor a plurality of slots in a duration before the point in time.

In some implementations, in selecting the resource, process 500 may involve processor 322 selecting the resource based on results of the aperiodic sensing and the periodic sensing.

In some implementations, the point in time may be a packet arrival time.

In some implementations, the selection window may include an overlapping duration between a periodic sensing pattern associated with the periodic sensing and a contiguous duration in which the aperiodic sensing is performed.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    performing one-shot sensing and periodic sensing prior to a transmission, wherein the one-shot sensing includes contiguous partial sensing, and the duration of the contiguous partial sensing is longer than that of the periodic sensing, to detect reserving resource outside a periodic sensing window;
    selecting a resource based on results of the one-shot sensing and the period sensing; and
    performing the transmission using the selected resource in a sidelink (SL) communication in a vehicle-to-everything (V2X) network.

2. The method of claim 1, wherein the performing of the one-shot sensing comprises performing the contiguous partial sensing to monitor a plurality of slots in a duration before transmitting on a reserved resource, a re-selected resource or the selected resource.

3. The method of claim 1, wherein the performing of the one-shot sensing and the periodic sensing comprises:
    identifying one or more candidate resources within a selection window after a point in time; and
    performing the one-shot sensing and the periodic sensing prior to the point in time based on a location in time of each of the one or more candidate resources.

4. The method of claim 3, wherein the performing of the one-shot sensing comprises performing the contiguous partial sensing to monitor a plurality of slots in a duration before the point in time.

5. The method of claim 4, wherein the selecting of the resource comprises selecting the resource based on results of the contiguous partial sensing and the periodic sensing.

6. The method of claim 3, wherein the point in time comprises a packet arrival time.

7. The method of claim 3, wherein the selection window comprises an overlapping duration between a periodic sensing pattern associated with the periodic sensing and a contiguous duration in which the one-shot sensing is performed.

8. A method, comprising:
    determining whether each of one or more candidate resources is subject to interference caused by periodic and aperiodic transmissions from one or more other user equipment (UEs) in a vehicle-to-everything (V2X) network by performing aperiodic sensing and periodic sensing, wherein the aperiodic sensing includes contiguous partial sensing, and the duration of the contiguous partial sensing is longer than that of the periodic sensing, to detect reserving resource outside a periodic sensing window;
    selecting a resource from the one or more candidate resources based on a result of the determining; and
    performing a sidelink (SL) communication using the selected resource.

9. The method of claim 8, wherein the determining whether each of the one or more candidate resources is subject to interference comprises:
    identifying the one or more candidate resources within a selection window after a point in time; and
    performing the aperiodic sensing and the periodic sensing prior to the point in time based on a location in time of each of the one or more candidate resources.

10. The method of claim 9, wherein the performing of the aperiodic sensing comprises performing the contiguous partial sensing to monitor a plurality of slots in a duration before the point in time.

11. The method of claim 9, wherein the selecting of the resource comprises selecting the resource based on results of the aperiodic sensing and the periodic sensing.

12. The method of claim 9, wherein the point in time comprises a packet arrival time.

13. The method of claim 9, wherein the selection window comprises an overlapping duration between a periodic sensing pattern associated with the periodic sensing and a contiguous duration in which the aperiodic sensing is performed.

14. An apparatus, comprising:
a transceiver configured to communicate wirelessly in a sidelink (SL) communication in a vehicle-to-everything (V2X) network; and
a processor coupled to the transceiver and configured to perform operations comprising:
performing, via the transceiver, one-shot sensing and periodic sensing prior to a transmission, wherein the one-shot sensing includes contiguous partial sensing, and the duration of the contiguous partial sensing is longer than that of the periodic sensing, to detect reserving resource outside a periodic sensing window;
selecting a resource based on results of the one-shot sensing and the period sensing; and
performing, via the transceiver, the transmission using the selected resource.

15. The apparatus of claim 14, wherein, in performing the one-shot sensing, the processor performs the contiguous partial sensing to monitor a plurality of slots in a duration before transmitting on a reserved resource, a re-selected resource or the selected resource.

16. The apparatus of claim 14, wherein, in performing the one-shot sensing and the periodic sensing, the processor performs operations comprising:
identifying one or more candidate resources within a selection window after a point in time; and
performing the one-shot sensing and the periodic sensing prior to the point in time based on a location in time of each of the one or more candidate resources.

17. The apparatus of claim 16, wherein, in performing the one-shot sensing, the processor performs the contiguous partial sensing to monitor a plurality of slots in a duration before the point in time.

18. The apparatus of claim 17, wherein, in selecting the resource, the processor selects the resource based on results of the contiguous partial sensing and the periodic sensing.

19. The apparatus of claim 16, wherein the point in time comprises a packet arrival time.

20. The apparatus of claim 16, wherein the selection window comprises an overlapping duration between a periodic sensing pattern associated with the periodic sensing and a contiguous duration in which the one-shot sensing is performed.

* * * * *